United States Patent [19]

Huber et al.

[11] Patent Number: 5,487,820
[45] Date of Patent: Jan. 30, 1996

[54] PROCESS FOR REMOVING LEAD DIOXIDE RESIDUES

[75] Inventors: Rudolf Huber, Garching; Norbert Paul, Altötting, both of Germany

[73] Assignee: Hoechst Aktiengesellschaft, Germany

[21] Appl. No.: 361,137

[22] Filed: Dec. 21, 1994

[30] Foreign Application Priority Data

Dec. 23, 1993 [DE] Germany .................... 43 44 034.7

[51] Int. Cl.⁶ ........................................ C25F 1/00
[52] U.S. Cl. ............................... 205/716; 205/723
[58] Field of Search ................. 204/145 R, 146, 204/141.5; 205/333, 219

[56] References Cited

U.S. PATENT DOCUMENTS

| | | | |
|---|---|---|---|
| 2,456,281 | 12/1948 | Hyner | 204/141 |
| 2,994,649 | 8/1961 | Morrison | 205/101 |
| 3,410,771 | 5/1965 | Sudrabin | 204/140 |
| 4,159,231 | 6/1979 | Smith et al. | 204/57 |

FOREIGN PATENT DOCUMENTS 2431554  3/1980  France .
1373611 11/1974  United Kingdom .

OTHER PUBLICATIONS

Database WPI, Derwent Publications Ltd., Abstract No. 90-136545 of JP-A-2 085 386.
Database WPI, Derwent Publications Ltd., Abstract No. 82-09184E of JP-A-56 166 386.

*Primary Examiner*—John Niebling
*Assistant Examiner*—Brendan Mee
*Attorney, Agent, or Firm*—Connolly & Hutz

[57] ABSTRACT

Lead dioxide residues are advantageously removed from conducting surfaces by cathodic reduction. The surface thus cleaned can directly have a new lead dioxide layer applied by cathodic oxidation.

6 Claims, No Drawings

PROCESS FOR REMOVING LEAD DIOXIDE RESIDUES

Lead dioxide is widely used in the chemical industry as an anode material, on the one hand owing to its high electrical conductivity and on the other hand because of its high oxidation potential and also because of its resistance to corrosion in acid electrolytes.

There are various ways of producing lead dioxide anodes. Usually the procedure is to apply the lead dioxide as a layer on an electrically conductive support, such as, for example, graphite, titanium, steel or alloy steels. The application is carried out by electrolytic coating processes, by electrolytically depositing lead dioxide on the support from an aqueous bath of a lead(II) salt.

Particularly for protecting the support from corrosive action, it is essential that the lead dioxide layers are free of cracks and holes and are very smooth and also have a certain minimum thickness. If these requirements are no longer met, recoating is required. So that this new coating adheres well and is as uniform as possible, it is necessary to remove the lead dioxide from the substrate without leaving any residue. The major part of the lead dioxide coating is removed by so-called thermal stripping, in which the anode is heated until most of the layer flakes off. However, the reapplication of a lead dioxide layer by anodic oxidation requires the removal of even the last residues of the lead dioxide. This removal has hitherto been very complicated: first the lead dioxide residues, which adhere firmly, are removed by sandblasting. Since this produces a lead-containing sand, this process can only be considered when proper disposal of this contaminated sand is ensured. In practice this generally means the transport of the workpieces to be cleaned to an appropriately equipped enterprise, and subsequently return transport. Added to the costs associated with this are, in each case, the disposal costs for the lead-containing sand.

After sandblasting, a further series of procedures is required, which frequently have to be repeated one or more times, namely rinsing, pickling, degreasing, renewed rinsing and passivation of the surface, before renewed anodic coating can be carried out.

It has now been found that this extraordinarily complicated removal of the lead dioxide residues can be omitted if the residues are eliminated by cathodic reduction. This procedure can be carried out in the same facility in which the anodic production of the lead dioxide coating is subsequently carried out. The transport procedures and the multistage cleaning operation described thus become unnecessary.

In the cathodic reduction of the invention, the electrolyte used is dilute nitric acid, advantageously in a concentration of from 2 to 10% by weight, in particular from 4 to 5% by weight.

The duration of treatment depends on the available apparatus and particularly on the current density and, of course, also on the dimensions of the workpiece to be cleaned. Current densities of from about 30 to 1000 A/m$^2$, in particular from about 50 to 250 A/m$^2$, are advantageous.

After removal of the lead dioxide residues, simple rinsing with deionized water is usually sufficient, directly after which the cleaned workpiece is connected as anode and the lead dioxide layer is applied by anodic oxidation in a known manner.

The cleaning process of the invention gives a uniform, strongly adhering lead dioxide coating without cracks or holes. It is also very suitable for large workpieces such as chemical reactors which require a uniform and impervious coating, even over welding seams and similar uneven areas.

The following example illustrates the invention.

EXAMPLE

A residual coating of lead dioxide having a thickness of less than 1 mm is to be removed from the middle section of a chemical reactor, comprising a 2 m long tube of material 1.454 (steel alloy) having an internal diameter of 500 mm. This tube is installed in the electrolysis apparatus in which the lead dioxide layer is later to be produced by anodic oxidation. However, for the cleaning of the invention, the tube is connected as cathode, charged with 5% strength by weight nitric acid and electrolysis is carried out at a current density of 100 A/m$^2$. The electrolyte is here moved relative to the tube surface. V2A steel is used as anode. After about 10 hours, the original lead dioxide layer has been removed without leaving a residue. The electrolyte is removed and the tube is rinsed with deionized water. It can thereupon be directly charged with the lead nitrate solution which serves as electrolyte for the subsequent production of the new lead dioxide layer.

We claim:

1. A process for removing lead dioxide residues on conducting surfaces, which comprises cathodically reducing the lead dioxide in dilute nitric acid as an electrolyte.

2. The process as claimed in claim 1, wherein the electrolyte used is nitric acid having a strength of from 2 to 10% by weight.

3. The process as claimed in claim 2, wherein the electrolyte used is nitric acid having a strength of from 4 to 5% by weight.

4. The process as claimed in claim 1, wherein the conducting surface supporting the lead dioxide residues is a steel surface.

5. The process as claimed in claim 1, wherein said process is carried out at a current density of from about 30 to 1,000 A/m$^2$.

6. The process as claimed in claim 1, wherein said process is carried out at a current density of from about 50 to 250 A/m$^2$.

* * * * *